United States Patent
Kushalnagar et al.

(10) Patent No.: US 10,430,770 B2
(45) Date of Patent: *Oct. 1, 2019

(54) SYSTEM AND METHOD FOR DISTRIBUTING DIGITAL RIGHTS MANAGEMENT DIGITAL CONTENT IN A CONTROLLED NETWORK ENSURING DIGITAL RIGHTS

(71) Applicant: Intel Corporation, Santa Clara, CA (US)

(72) Inventors: Nandakishore R. Kushalnagar, Portland, OR (US); Michael D. Jeronimo, Wilsonville, OR (US); Francis M. Tharappel, Portland, OR (US); Daniel Baumberger, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 1370 days.

This patent is subject to a terminal disclaimer.

(21) Appl. No.: 14/517,556

(22) Filed: Oct. 17, 2014

(65) Prior Publication Data

US 2015/0039516 A1    Feb. 5, 2015

Related U.S. Application Data

(60) Continuation of application No. 13/335,058, filed on Dec. 22, 2011, now abandoned, which is a division of
(Continued)

(51) Int. Cl.
*G06Q 20/12* (2012.01)
*G06F 21/10* (2013.01)
(Continued)

(52) U.S. Cl.
CPC ......... *G06Q 20/1235* (2013.01); *G06F 21/10* (2013.01); *G06F 21/105* (2013.01);
(Continued)

(58) Field of Classification Search
CPC ............ G06Q 20/1235; G06Q 2220/18; G06F 21/105; G06F 21/10
See application file for complete search history.

(56) References Cited

U.S. PATENT DOCUMENTS 5,390,297 A * 2/1995 Barber ................... G06F 21/105
                                                     705/59
5,790,664 A * 8/1998 Coley ..................... G06F 21/10
                                                     709/203

(Continued)

*Primary Examiner* — Steven S Kim
(74) *Attorney, Agent, or Firm* — Barnes & Thornburg LLP

(57) ABSTRACT

A system and method for managing digital rights. The method includes receiving a Universal Resource Identifier (URI). The URI is used to identify a location for a user selected digital media item. The digital media item is to be played in a local area network (LAN). The selected digital media item is retrieved from a content server over a network connection. If the selected digital media item is encrypted, a license to decrypt the selected media item is obtained. Access to the license is based on a plurality of access rules. The plurality of access rules are based on the terms of the license. The plurality of access rules may also include personal owner rules. If a request for the license adheres to the access rules, the license is received via a secure out of band transfer and the selected digital media item is decrypted for playback via one or more media rendering devices.

20 Claims, 4 Drawing Sheets

Related U.S. Application Data application No. 10/616,614, filed on Jul. 9, 2003, now abandoned.

(51) Int. Cl.
  *G06Q 30/06* (2012.01)
  *G06Q 50/18* (2012.01)

(52) U.S. Cl.
  CPC ............ *G06Q 30/06* (2013.01); *G06Q 50/184* (2013.01); *G06F 2221/07* (2013.01); *G06Q 2220/18* (2013.01)

(56) References Cited

U.S. PATENT DOCUMENTS

| | | | | |
|---|---|---|---|---|
| 5,825,890 A * | 10/1998 | Elgamal | ............... | H04L 29/06 713/151 |
| 5,892,900 A * | 4/1999 | Ginter | ............... | G06F 21/10 726/26 |
| 6,088,733 A * | 7/2000 | Kikuchi | ............... | G10H 1/0066 709/231 |
| 6,105,069 A * | 8/2000 | Franklin | ............... | G06F 21/10 709/217 |
| 6,226,618 B1 * | 5/2001 | Downs | ............... | G06F 21/10 380/279 |
| 6,658,568 B1 * | 12/2003 | Ginter | ............... | G06F 21/10 348/E5.006 |
| 6,775,655 B1 * | 8/2004 | Peinado | ............... | G06F 21/10 705/51 |
| 7,103,663 B2 * | 9/2006 | Inoue | ............... | G06F 21/10 348/E7.063 |
| 7,124,304 B2 * | 10/2006 | Bel | ............... | G06F 21/10 713/193 |
| 7,337,217 B2 * | 2/2008 | Wang | ............... | G06F 3/0481 386/E5.002 |
| 7,483,958 B1 * | 1/2009 | Elabbady | ............... | G06F 21/10 709/217 |
| 7,549,056 B2 * | 6/2009 | Carr | ............... | G06F 21/10 713/165 |
| 7,725,399 B2 * | 5/2010 | Nakahara | ............... | G06F 21/10 380/239 |
| 7,831,517 B1 * | 11/2010 | Vijay | ............... | G06F 21/121 705/59 |
| 7,934,263 B2 * | 4/2011 | Singer | ............... | G06F 21/10 726/26 |
| 7,987,491 B2 * | 7/2011 | Reisman | ............... | G06F 17/30873 725/112 |
| 7,996,335 B2 * | 8/2011 | Shirai | ............... | G06F 21/10 380/201 |
| 8,011,015 B2 * | 8/2011 | Singer | ............... | G06F 21/10 726/31 |
| 8,150,235 B2 * | 4/2012 | Hamilton | ............... | G11B 27/034 386/278 |
| 8,191,154 B2 * | 5/2012 | Singer | ............... | G06F 21/10 726/26 |
| 10,108,945 B2 * | 10/2018 | Kushalnagar | ............... | G06F 21/10 |
| 2002/0013772 A1 * | 1/2002 | Peinado | ............... | G06F 21/10 705/51 |
| 2002/0157007 A1 * | 10/2002 | Sashihara | ............... | H04L 63/083 713/183 |
| 2002/0186844 A1 * | 12/2002 | Levy | ............... | G06F 17/30017 380/231 |
| 2003/0159033 A1 * | 8/2003 | Ishiguro | ............... | G06F 21/10 713/156 |
| 2003/0229593 A1 * | 12/2003 | Raley | ............... | G06F 21/10 705/55 |
| 2004/0003079 A1 * | 1/2004 | Aiu | ............... | G06F 21/10 709/225 |
| 2008/0019516 A1 * | 1/2008 | Fransdonk | ............... | H04N 7/1675 380/201 |

* cited by examiner

SYSTEM AND METHOD FOR DISTRIBUTING DIGITAL RIGHTS MANAGEMENT DIGITAL CONTENT IN A CONTROLLED NETWORK ENSURING DIGITAL RIGHTS

RELATED APPLICATION

This application is a continuation application of U.S. application Ser. No. 13/335,058, entitled "SYSTEM AND METHOD FOR DISTRIBUTING DIGITAL RIGHTS MANAGEMENT DIGITAL CONTENT IN A CONTROLLED NETWORK ENSURING DIGITAL RIGHTS," which was filed on Dec. 22, 2011, and which is a divisional application of U.S. application Ser. No. 10/616,614, entitled "SYSTEM AND METHOD FOR DISTRIBUTING DIGITAL RIGHTS MANAGEMENT DIGITAL CONTENT IN A CONTROLLED NETWORK ENSURING DIGITAL RIGHTS," which was filed on Jul. 9, 2003.

FIELD OF THE INVENTION

The present invention is generally related to the field of digital rights management. More particularly, the present invention is related to a system and method for distributing digital content in a controlled network ensuring digital rights.

DESCRIPTION

In the last few years, the use of digital media of all types, such as digital audio and video, has grown in popularity. As more and more users enjoy access to digital content, the risk to content providers of losing sales to content piracy increases. In fact, many content providers refrain from providing media content over the Internet because of piracy concerns. Digital Rights Management (DRM) technology protects the rights of content owners and enforces the proper use of the content by consumers. These rights, in the form of digital information, must be distributed and enforced by media rendering devices in a network environment.

In a typical home network, a user may have digital content stored on the user's PC (personal computer). The user may also have other devices in the home that are capable of playing digital media, such as, for example, portable MP3 players, boom boxes, home theater systems, etc. The digital content stored on the PC may be rights-managed content. In many instances, the user may want to play the rights-managed digital content on any of the rendering devices in the home.

Rights-managed content typically contains meta information to inform media renderers of which license to acquire and where the license may be acquired. The meta information may include a keyID. The keyID is a unique identifier for the license. The meta information may also include a licenseURI. The licenseURI is a reference to a license server that the media renderer is to use to acquire the license to play the content.

The media renderer obtains a license to play the digital content from a license server using the reference keyID. Once a client acquires the license, a cryptographic key contained in the license is used to decrypt and render the media.

Today, the license for the digital content is managed at a device level and not at a user level. In order to play the rights-managed content on other rendering devices, the user must obtain a license for a particular device and the license is downloaded for that particular device. Thus, the file for that license can only be played on the device in which the license was obtained. In other words, the user is not licensed to play the file on any device in the home although the user is willing to pay for the license. This is a major impediment when there are many rendering devices in the home, such as, but not limited to, home A/V (audio/video) equipment, PCs, MP3 players, digital video recorders, etc. The user may have content stored, perhaps on the PC, but may also want to play the content on another device within the home. Today's digital rights management licensing technology does not support this scenario.

Thus, what is needed is a system and method for enabling a licensed user to distribute digital content on more than one device within the home in a secure manner. What is further needed is a local license server for managing the distribution of licenses in the home to enable various devices within the home to request and receive a license to play rights-managed content.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are directed to a system and method for distributing digital rights management (DRM) digital content in a controlled network ensuring digital rights. This is accomplished by employing a local license server. In one embodiment, the local license server may be implemented within a home media server. In other embodiments, the local license server may be implemented anywhere in the controlled network. The local license server provides programmatic interfaces to acquire and distribute licenses to any rendering device on a home network. A media rendering device on the home network may request and receive a license to play rights-managed digital content. Other devices on the home network may also request and receive licenses to play the same rights-managed digital content. This eliminates the need to obtain a license for a particular rendering device. The local license server maintains and enforces the terms of the license agreement. All of this is accomplished with very little user intervention.

Figure 1:
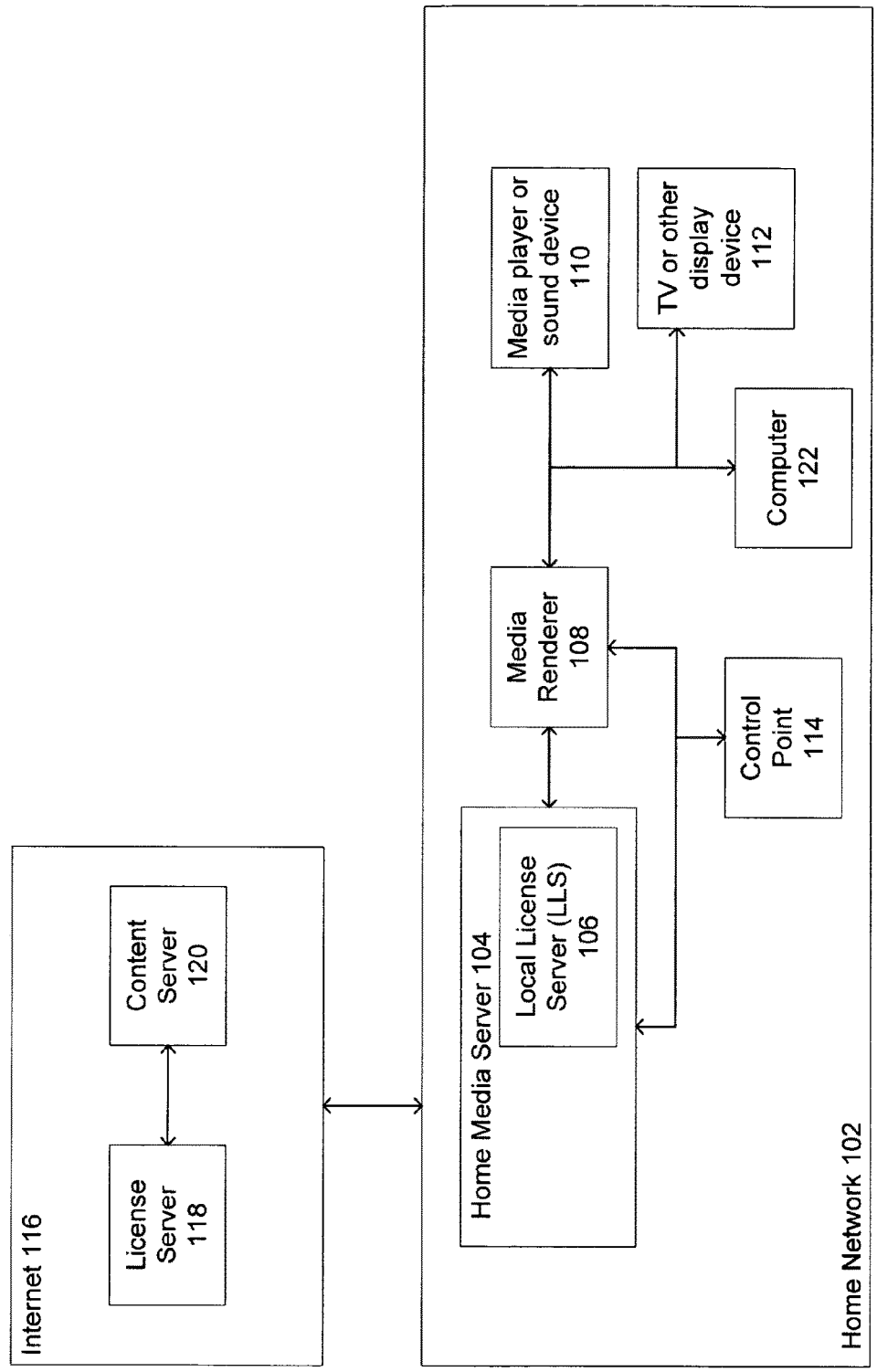
FIG. 1 is a block diagram illustrating an exemplary system architecture for distributing DRM digital content in a controlled network ensuring digital rights according to an embodiment of the present invention.

FIG. 1 is a block diagram illustrating an exemplary system architecture 100 for distributing digital rights management (DRM) digital content in a controlled network ensuring digital rights. System architecture 100 comprises a home network 102 and a wide area network (WAN), such as the Internet 116. Home network 102 is coupled to Internet 116. Home network 102 may be coupled to Internet 116 using dial-in connections, high-speed cable, digital subscriber lines (DSL), or any other well-known manner.

Home network 102 is a local area network (LAN) that connects computers, audio/video players, televisions, personal digital assistants (PDAs), etc. using a wired or wireless medium, such as, for example, Ethernet or Bluetooth (or any other wireless protocol based on the IEEE 802.11 standard, IEEE Standards for Information Technology—Telecommunications and Information Exchange Between Systems, ISO/IEC 8802-11 (1999)), respectively. Home network 102 comprises a home media server 104, a media renderer 108, a plurality of media rendering devices, such as, for example, a media player or sound device 110, a TV or other media display device 112, and a personal computer (PC) 122, and a control point 114. Media player or sound device 110 may include, but is not limited to, a compact disk (CD) player, a MPEG-audio layer 3 (MP3) player, Windows Media Audio (WMA) player, etc. Other media display devices may include, but are not limited to, digital versatile disc (DVD) players, video digital recorders (VDRs), home theater systems, etc.

Home media server 104 is a server located in the home that contains references to encrypted DRM media. In one embodiment, home media server 104 contains an enumeration of all of the media items, including a Universal Resource Identifier (URI) of each media item (i.e., where the media may be located) and the type of each media item, such as, for example, music, movies, video games, etc. In another embodiment, home media server 104 may also contain the actual media itself. Applications, such as, but not limited to, browser applications, on home network 102 may be used to browse home media server 104. In one embodiment, home media server 104 may include a local license server 106 co-located within home media server 104. In an alternative embodiment, local license server 106 may be located outside of home media server 104, yet co-located with home media server 104.

Local license server 106 is a license server that manages digital media rights in home network 102. Local license server provides programmatic interfaces to acquire, manage, and distribute licenses to any rendering devices on home network 102. Local license server 106 will be discussed in more detail below.

Media renderer 108 is a device that can play digital media or aid in playing digital media available from a wide-area network (WAN), such as Internet 116. In one embodiment, media renderer 108 may be a set-top box. In another embodiment, media renderer 108 may be a media center. In one embodiment, media renderer 108 may be a UPnP™ device, thus enabling media rendering devices 110 and 112 to also be UPnP™ devices.

Media renderer 108 is capable of recognizing media, and can retrieve the keyID and the licenseURI from encrypted media content prior to decrypting. As previously stated, the keyID is a unique identifier for a license and the licenseURI is a reference to a license server that media renderer 108 may use to acquire a license to play the desired digital content.

Control point 114 is a wireless device similar to a remote control, PDA, or any other device that aids in controlling components within a home network, such as home network 102. Control point 114 sends and receives control actions and responses to operate various devices on home network 102, such as, but not limited to, home media server 104, local license server 106, and media renderer 108, and provides information for obtaining media licenses.

Internet 116 may comprise, inter alia, one or more content servers, such as content server 120, and one or more license servers, such as license server 118. Content server 120 is an Internet-based server for storing encrypted media created by various content providers. The encrypted media stored on content server 120 may be retrieved by clients over Internet 116. In one embodiment, content server 120 may be a Web server that stores and provides rights-managed content to clients. In another embodiment, content server 120 may be a media server for storing and streaming digital media. In yet another embodiment, content server 120 may store and stream digital media, including rights-managed digital content to clients.

License server 118 is an Internet-based server for storing and managing licenses for any form of media. A pointer to license server 118 is referred to as the licenseURI. The licenses in license server 118 are indexed. The keyID identifies a particular license in license server 118.

Embodiments of the present invention use local license server 106 to provide key functionalities for enabling the distribution of licenses to media rendering devices, such as media rendering devices 110, 112, and 122, within home network 102. For example, local license server 106 retrieves the keyID and licenseURI of the desired license from control point 114 and provides a means to acquire the license from license server 118. Local license server 106 provides a secure method to distribute the acquired license inside the home network by making sure that the license is not being infringed. This is accomplished by managing rules underlying the license from license servers, such as license server 118. Local license server 106 also provides an interface to manage and share the digital rights management digital content.

Figure 2:
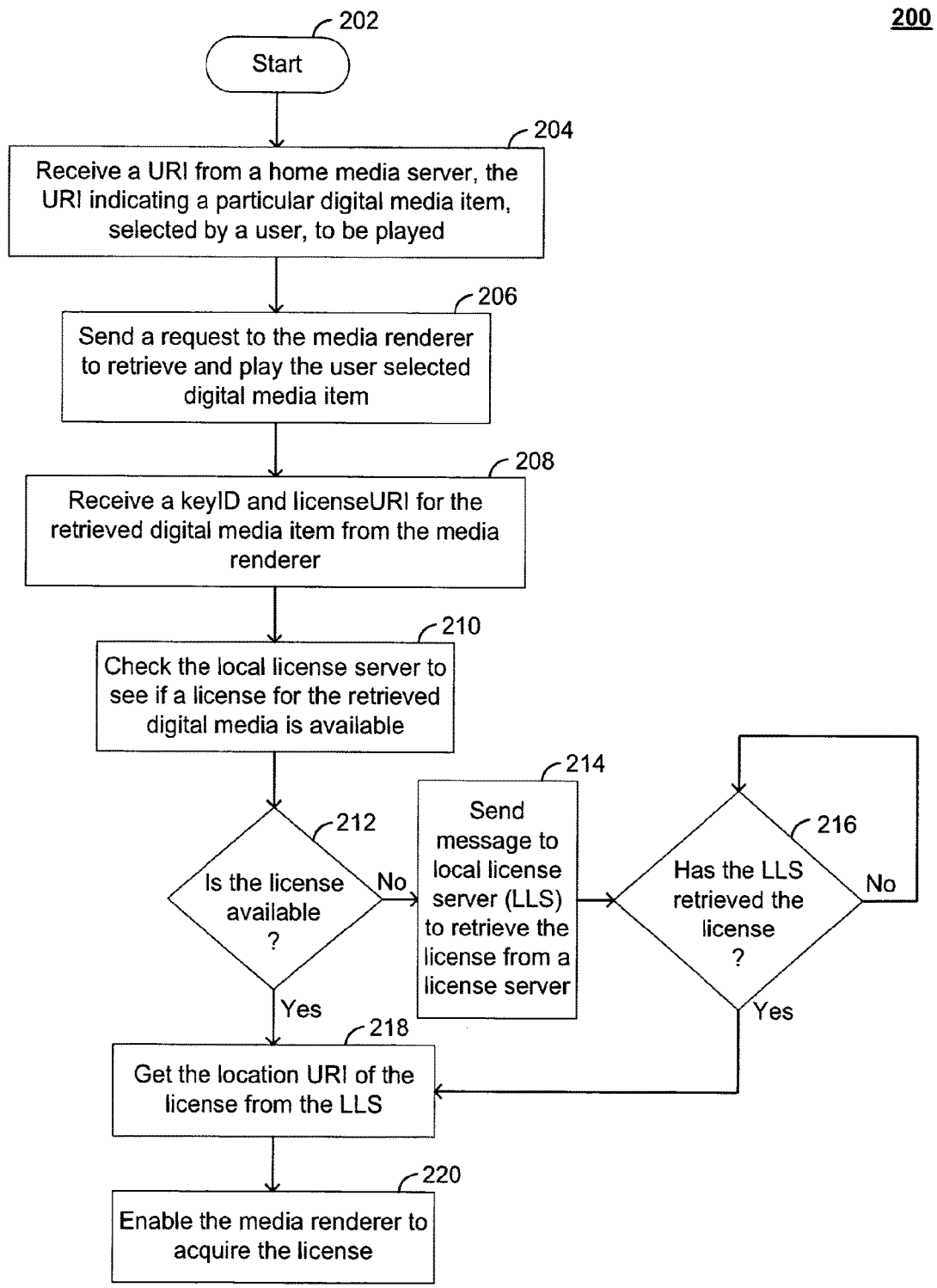
FIG. 2 is a flow diagram describing an exemplary method for distributing DRM digital content in a controlled network ensuring digital rights according to an embodiment of the present invention.

FIG. 2 is an exemplary flow diagram 200 describing a method for distributing DRM digital content in a controlled network ensuring digital rights according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process is described from the perspective of control point 114. The process begins with block 202, where the process immediately proceeds to block 204.

In block 204, control point 114 enables a user to browse home media server 104 to select a media item to be played. When the media selection has been made, control point 114 receives a URI from home media server 104 for the media item selected by a user. The URI indicates a particular digital media item that the user desires to be played on one or more of media renderer devices 110, 112, and/or 122 in home network 102.

In block 206, control point 114 sends a request to media renderer 108 to retrieve and play the selected digital media item. The request includes the URI for the particular digital media item. Once media renderer 108 retrieves the desired digital media item and determines that the media item requires a license to be played (which is indicated as an event to control point 114), control point 114 will receive the keyID and licenseURI for the digital media item from media renderer 108 in block 208.

In block 210, control point 114 checks local license server 106 to see if the license identified by the keyID and licenseURI is available at local license server 106.

In decision block 212, it is determined whether the license is available from local license server 106. If the license is not available from local license server 106, control point 114 will send a message to local license server 106 to retrieve the license from a license server (block 214). Local license server 106 will retrieve the license using the keyID and licenseURI from the license server designated by the licenseURI, such as license server 118. The process employed by local license server 106 to retrieve the license is described in detail below with reference to FIG. 3. The process then proceeds to decision block 216.

In decision block 216, it is determined whether local license server 106 has retrieved the license from license server 118. If local license server 106 has not retrieved the license, the process remains at block 216 to wait until local license server 106 has retrieved the license. If a predetermined time has passed without control point 114 receiving an indication that local license server 106 has received the license, the process will timeout. If local license server 106 has retrieved the license, control point 114 will receive an indication from local license server 106 that the license has arrived and the process will proceed to block 218.

Returning to decision block 212, if it is determined that the license is available at local license server 106, the process proceeds to block 218.

In block 218, control point 114 retrieves a location URI of the license from local license server 106. The location URI is the location of the license at local license server 106. The location URI is then sent to media renderer 108 to enable media renderer 108 to acquire the license, based on the rules or terms of the license, from local license server 106 and decrypt the media content to enable play of the selected media item on the appropriate media device(s) (block 220). The process for enabling media renderer 108 to acquire the license, based on the rules of the license, is described below with reference to FIG. 4.

Figure 3:
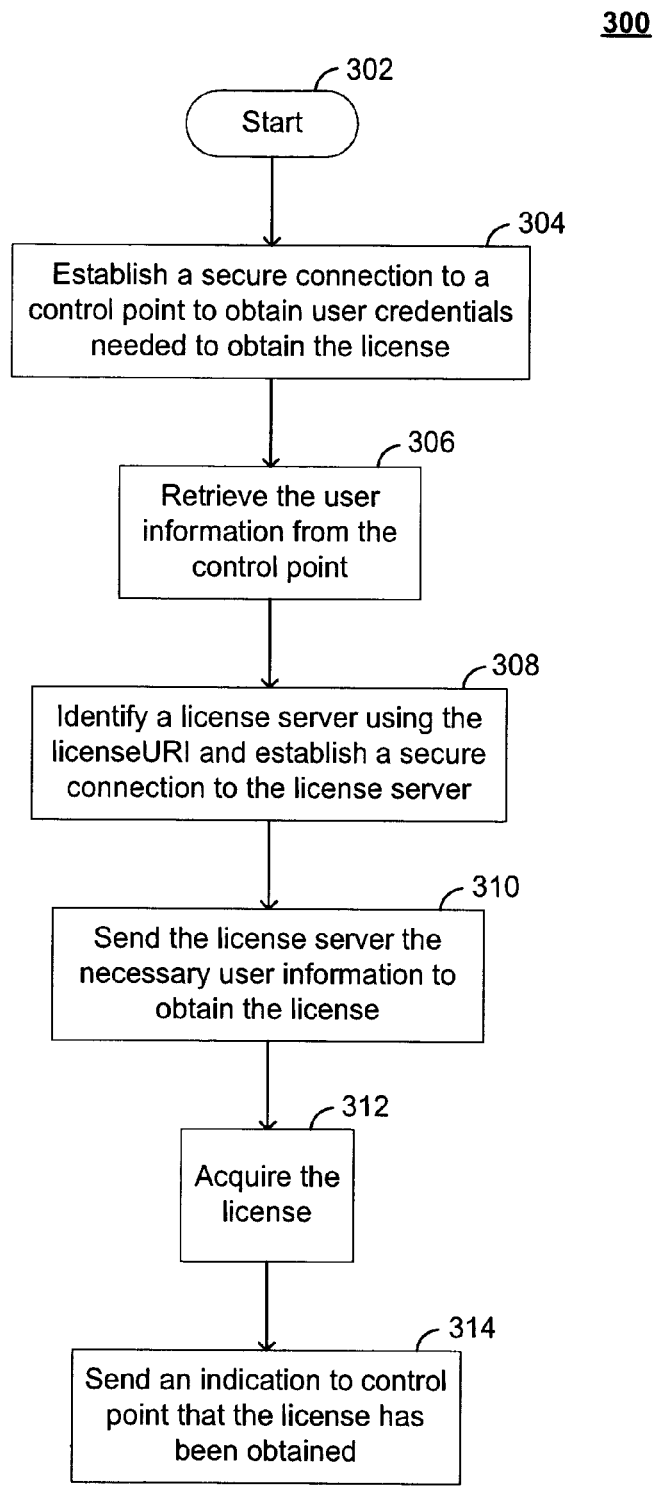
FIG. 3 is a flow diagram describing an exemplary method for obtaining a license for a digital media item according to an embodiment of the present invention.

FIG. 3 is an exemplary flow diagram 300 describing a method for obtaining a license for a digital media item according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302, where the process immediately proceeds to block 304.

In block 304, local license server 106 establishes a secure connection to control point 114 to obtain all necessary user credentials for acquiring a new license. In one embodiment, a secure sockets layer (SSL) protocol is used to establish a secure connection. One skilled in the relevant art(s) would know that other secure protocols may also be used as well. The necessary user credentials may include, but are not limited to, user name and address, credit card number, expiration date of the credit card, the terms of the new license sought to be obtained, etc. The terms of the new license may include, but are not limited to, the number of times the media item may be played, the number of devices the media item may be played on at one time, when the license expires, etc. After the secure connection is established, local license server 106 retrieves the necessary user information from control point 114 in block 306.

In block 308, local license server 106 identifies a license server using the licenseURI and establishes a secure connection to the license server on Internet 116.

In block 310, local license server 106 sends license server 118 the required information to obtain the new license. The required information includes the keyID and the necessary user information received from control point 114.

In block 312, the local license server acquires the new license using the keyID. The new license includes the terms or rules of the license that must be adhered to by local license server 106 in maintaining and enforcing the license. After acquiring the new license, local license server 106 informs control point 114 that the new license is now available (block 314).

Figure 4:
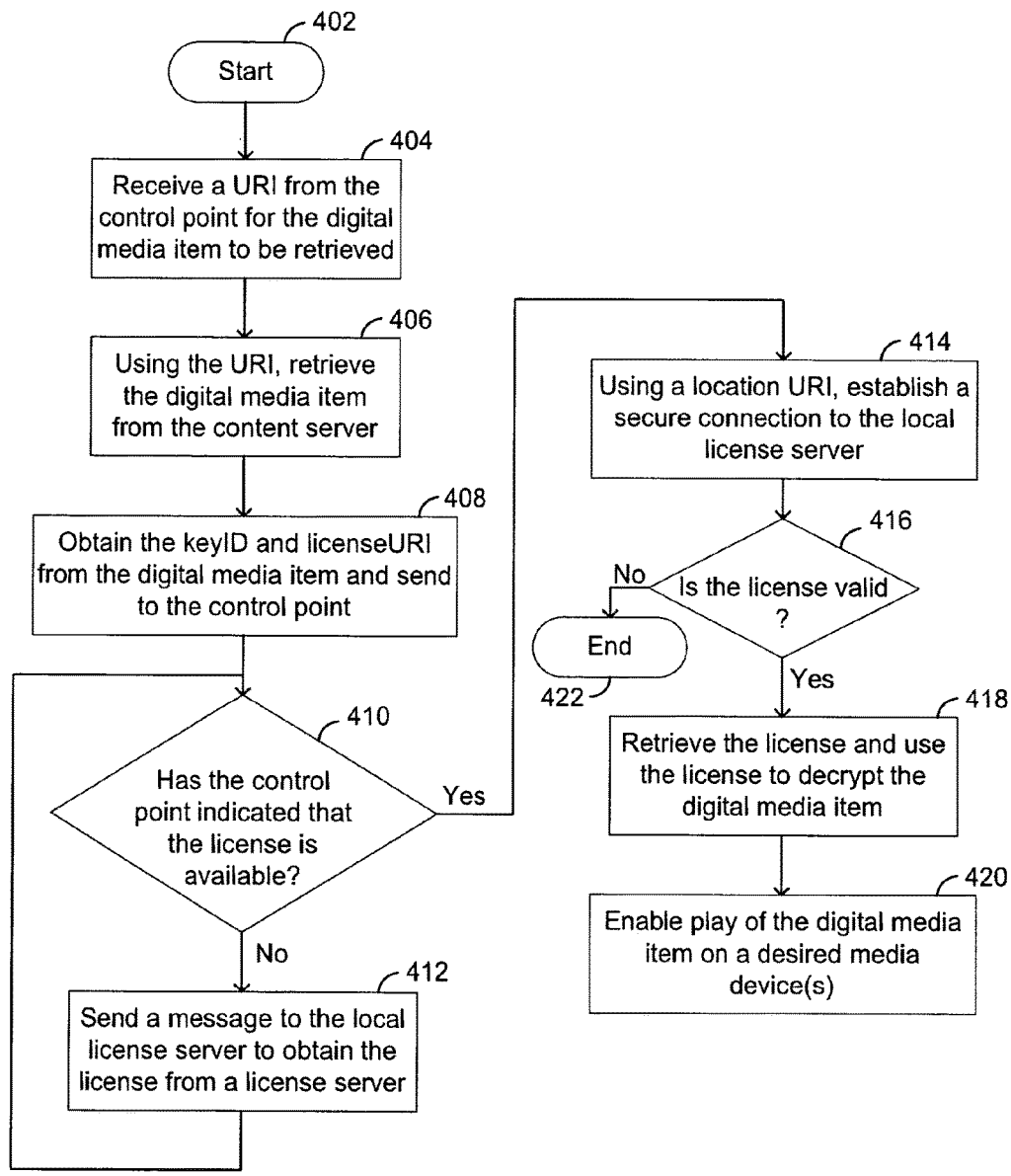
FIG. 4 is a flow diagram describing an exemplary method for enabling a media renderer to acquire a license from a local license server to enable playback of digital media on a media rendering device.

FIG. 4 is an exemplary flow diagram 400 further describing a method for enabling a media renderer to acquire a license from a local license server to enable play of a digital media item on a media device. The invention is not limited to the embodiment described herein with respect to flow diagram 400. Rather, it will be apparent to persons skilled in the relevant art(s) after reading the teachings provided herein that other functional flow diagrams are within the scope of the invention. The process begins with block 402, where the process immediately proceeds to block 404.

In block 404, media renderer 108 receives a URI from control point 114 for the user selected digital media item to be retrieved. Using the URI, media renderer 108 retrieves the digital media item from a content server, such as content server 120, in block 406. In one embodiment, a simple Hypertext Transfer Protocol (HTTP) GET request may be used to retrieve the selected digital media item. One skilled in the relevant art(s) would know that other protocols may also be used.

The media item may be encrypted. If the media item is encrypted, a license must be obtained to enable media renderer 108 to play the selected media item. As previously indicated, the licenseURI and keyID, which are not encrypted, but are included in the encrypted digital media item, may be obtained by media renderer 108 to determine the location of the license. When media renderer 108 determines that the media item is encrypted, media renderer 108 obtains the keyID and licenseURI from the retrieved media item and sends them to control point 114 (block 408). As previously indicated, the keyID and licenseURI are used by local license server 106 to retrieve the license. The process then proceeds to decision block 410.

In decision block 410, it is determined whether control point 114 has indicated that the license is available from the local license server. If control point 114 has not sent an indication that the license is available from local license server 106, then media renderer 108 will send a message to local license server 106 via control point 114 to obtain the license from a license server, such as license server 118, using the licenseURI and keyID (block 412). In one embodiment, media renderer 108 may send the message directly to local license server 106 to obtain the license from the license server. The process then returns to decision block 410 to see if control point 114 has indicated that the license is available at local license server 106.

In decision block 410, if control point 114 has provided an indication that the license is available from local license server 106, the indication will include a location URI. The location URI provides the location of the license within local license server 106. The process then proceeds to block 414.

In block 414, media renderer 108 establishes a secure connection to local license server 106. Using the location URI, media renderer 108 requests that the license be sent from local license server 106 to enable the decryption of the user's selected media item in block 418. Note that the license contains a key that enables media renderer 108 to decrypt the media content.

Before local license server 106 may send the requested license, local license server 106 must validate license access rules to determine whether the license may be transferred to media renderer 108. License access rules include the terms of the license. For example, if the license was obtained for enabling play of the media item five (5) times and the media item has already been played 5 times, local license server 106 will adhere to the access rules of the license and will deny the license to media renderer 108. This requires local license server 106 to manage the license by tracking the usage of the license. In another example, if the license requires that the media be played on a maximum of two devices, local license server 106 must ensure that media renderer 108 will not play the media on more than two media rendering devices before transferring the license to media renderer 108. Thus, embodiments of the present invention allow other media devices within the home network to also play the media content if the terms of the license purchased by the user allow for multiple devices to be used. Therefore, embodiments of the present invention do not limit the playback of media content to one device on the home network, but allow multiple devices to play the media content at the same time.

In one embodiment, license access rules may include owner rules for playing media licenses. Owner rules are personal rules that are integrated into the license access rules to be used by local license server 106 in managing a license. Owner rules may include, but are not limited to, an indication of who can play the selected digital media, an indication of when the selected digital media can be played, and an indication as to the number of times the digital media can be played by certain individuals. For example, a parent may purchase a license to play a video game for his/her children, but the parent only wants the children to play the game on weekends. The parent may stipulate a rule to local license server 106 that when the game is requested by his/her children, that the license be transferred to media renderer 108 only on weekends. In this instance, local license server may only provide the license on a Saturday or Sunday.

In decision block 416, it is determined whether the license is valid. Again, this process is performed by local license server 106 as indicated above. If the license is valid, control passes to block 418.

In block 418, the license is sent to media renderer 108 via a secure out of band license transfer. The key from the license is then used by media renderer 108 to decrypt the media content.

In block 420, play of the digital media item is then enabled on the desired media device(s). Once the digital media item has been played, the digital media item is no longer located at media renderer 108.

Returning to decision block 416, if local license server 106 determines the indicated use of the license to be invalid, the license is not sent to media renderer 108. Therefore, the digital media item cannot be decrypted, and the process proceeds to block 422, where the process ends.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

The invention claimed is:

1. A home media server to locally manage digital media rights, the home media server comprising:
   a hardware processor; and
   a memory storing media selection logic and a local license server;
   wherein the media selection logic when executed by the hardware processor causes the hardware processor to (i) store an enumeration of digital media items selectable by a user for local playback on a media rendering device communicatively coupled to the home media server via a local area network, (ii) receive a selection associated with an encrypted digital media item from a control point communicatively coupled to the home media server, and (iii) transmit a first Universal Resource Identifier indicative of a media location at which the selected encrypted digital media item is located to the control point for transmission to the media rendering device; and
   wherein the local license server when executed by the hardware processor causes the hardware processor to (i) receive a message and user information from the control point to retrieve a license required to decrypt the selected encrypted digital media item, wherein the received message comprises a key identifier and a second Universal Resource Identifier indicative of a remote location of a remote license server communicatively coupled to the home media server and at which the required license is located, (ii) retrieve the required license from the remote license server with the user information based on the key identifier and the second Universal Resource Identifier, (iii) transmit a third Universal Resource Identifier to the control point, the third Universal Resource Identifier is indicative of a local location of the home media server at which the retrieved required license is located, (iv) receive a request for the retrieved required license from the media rendering device based on the third Universal Resource Identifier, and (v) transmit the retrieved required license to the media rendering device to decrypt the selected encrypted digital media item based on one or more usage rules of the retrieved required license.

2. The home media server of claim 1, wherein to transmit the retrieved required license based on the one or more usage rules of the retrieved required license comprises to (i) determine whether the retrieved required license is valid based on the one or more usage rules and (ii) transmit the retrieved required license in response to a determination that the retrieved required license is valid or deny transmission of the retrieved required license to the media rendering device in response to a determination that the retrieved required license is invalid.

3. The home media server of claim 2, wherein the one or more usage rules of the retrieved required license comprises at least one of a number of times the selected encrypted digital media item is permitted to be played, a number of media rendering devices the selected encrypted digital media item is permitted to be played on, an expiration of the retrieved required license, a length of time the user is permitted to play the selected encrypted digital media item, an indication of one or more users permitted play the selected encrypted digital media item, an indication of when the selected encrypted digital media item is permitted to be played, or a number of times the selected encrypted digital media item is permitted to be played by another user.

4. The home media server of claim 2, wherein the one or more usage rules of the retrieved required license comprise (i) a first usage rule associated with terms of the retrieved required license purchased by the user and (ii) a second usage rule associated with additional terms of the retrieved required license stipulated by the user.

5. The home media server of claim 4, wherein the first usage rule of the retrieved required license comprises at least one of a number of times the selected encrypted digital media item is permitted to be played, a number of media rendering devices the selected encrypted digital media item is permitted to be played on, an expiration of the retrieved required license, or a length of time the user is permitted to play the selected encrypted digital media item; and
   wherein the second usage rule of the retrieved required license comprises at least one of an indication of one or more users permitted play the selected encrypted digital media item, an indication of when the selected encrypted digital media item is permitted to be played, or a number of times the selected encrypted digital media item is permitted to be played by another user.

6. The home media server of claim 1, wherein the local license server is further to track usage of the retrieved required license.

7. The home media server of claim 1, wherein the local license server is further to identify the remote license server based on the second Universal Resource Identifier.

8. The home media server of claim 1, wherein to transmit the retrieved required license to the media rendering device comprises to transmit the retrieved required license to the media rendering device via a secure out-of-band transmission.

9. A non-transitory, machine-readable medium comprising a plurality of instructions stored thereon that in response to being executed by a home media server, cause the home media server to:
   store an enumeration of digital media items selectable by a user for local playback on a media rendering device communicatively coupled to the home media server via a local area network;
   receive a selection associated with an encrypted digital media item from a control point communicatively coupled to the home media server;
   transmit a first Universal Resource Identifier indicative of a media location at which the selected encrypted digital media item is located to the control point for transmission to the media rendering device;
   receive a message and user information from the control point to retrieve a license required to decrypt the selected encrypted digital media item, wherein the received message comprises a key identifier and a second Universal Resource Identifier indicative of a remote location of a remote license server communicatively coupled to the home media server and at which the required license is located;

retrieve the required license from the remote license server with the user information based on the key identifier and the second Universal Resource Identifier;

transmit a third Universal Resource Identifier to the control point, the third Universal Resource Identifier is indicative of a local location of the home media server at which the retrieved required license is located;

receive a request for the retrieved required license from the media rendering device based on the third Universal Resource Identifier; and transmit the retrieved required license to the media rendering device to decrypt the selected encrypted digital media item based on one or more usage rules of the retrieved required license.

10. The non-transitory, machine-readable medium of claim 9, wherein to transmit the retrieved required license based on the one or more usage rules of the retrieved required license comprises to (i) determine whether the retrieved required license is valid based on the one or more usage rules and (ii) transmit the retrieved required license in response to a determination that the retrieved required license is valid or deny transmission of the retrieved required license to the media rendering device in response to a determination that the retrieved required license is invalid.

11. The non-transitory, machine-readable medium of claim 10, wherein the one or more usage rules of the retrieved required license comprises at least one of a number of times the selected encrypted digital media item is permitted to be played, a number of media rendering devices the selected encrypted digital media item is permitted to be played on, an expiration of the retrieved required license, a length of time the user is permitted to play the selected encrypted digital media item, an indication of one or more users permitted play the selected encrypted digital media item, an indication of when the selected encrypted digital media item is permitted to be played, or a number of times the selected encrypted digital media item is permitted to be played by another user.

12. The non-transitory, machine-readable medium of claim 10, wherein the one or more usage rules of the retrieved required license comprise (i) a first usage rule associated with terms of the retrieved required license purchased by the user and (ii) a second usage rule associated with additional terms of the retrieved required license stipulated by the user.

13. The non-transitory, machine-readable medium of claim 12, wherein the first usage rule of the retrieved required license comprises at least one of a number of times the selected encrypted digital media item is permitted to be played, a number of media rendering devices the selected encrypted digital media item is permitted to be played on, an expiration of the retrieved required license, or a length of time the user is permitted to play the selected encrypted digital media item; and wherein the second usage rule of the retrieved required license comprises at least one of an indication of one or more users permitted play the selected encrypted digital media item, an indication of when the selected encrypted digital media item is permitted to be played, or a number of times the selected encrypted digital media item is permitted to be played by another user.

14. The non-transitory, machine-readable medium of claim 9, wherein the plurality of instructions further cause home media server to track usage of the retrieved required license.

15. The non-transitory, machine-readable medium of claim 9, wherein the plurality of instructions further cause home media server to identify the remote license server based on the second Universal Resource Identifier.

16. The non-transitory, machine-readable medium of claim 9, wherein to transmit the retrieved required license to the media rendering device comprises to transmit the retrieved required license to the media rendering device via a secure out-of-band transmission.

17. A method for locally managing digital media rights, the method comprising:

storing, by a home media server, an enumeration of digital media items selectable by a user for local playback on a media rendering device communicatively coupled to the home media server via a local area network;

receiving, by the home media server, a selection associated with an encrypted digital media item from a control point communicatively coupled to the home media server;

transmitting, by the home media server, a first Universal Resource Identifier indicative of a media location at which the selected encrypted digital media item is located to the control point for transmission to the media rendering device;

receiving, by a local license server of the home media server, a message and user information from the control point to retrieve a license required to decrypt the selected encrypted digital media item, wherein the received message comprises a key identifier and a second Universal Resource Identifier indicative of a remote location of a remote license server communicatively coupled to the home media server and at which the required license is located;

retrieving, by the local license server and using the user information, the required license from the remote license server based on the key identifier and the second Universal Resource Identifier;

transmitting, by the local license server, a third Universal Resource Identifier to the control point, the third Universal Resource Identifier is indicative of a local location of the home media server at which the retrieved required license is located;

receiving, by the local license server, a request for the retrieved required license from the media rendering device based on the third Universal Resource Identifier; and transmitting, by the local license server, the retrieved required license to the media rendering device to decrypt the selected encrypted digital media item based on one or more usage rules of the retrieved required license.

18. The method of claim 17, wherein transmitting the retrieved required license based on the one or more usage rules of the retrieved required license comprises (i) determining whether the retrieved required license is valid based on the one or more usage rules and (ii) transmitting the retrieved required license in response to determining that the retrieved required license is valid or denying transmission of the retrieved required license to the media rendering device in response to determining that the retrieved required license is invalid.

19. The method of claim 18, wherein the one or more usage rules of the retrieved required license comprise (i) a first usage rule associated with terms of the retrieved required license purchased by the user and (ii) a second usage rule associated with additional terms of the retrieved required license stipulated by the user.

20. The method of claim 17, further comprising tracking, by the local license server, usage of the retrieved required license.

\* \* \* \* \*